(12) United States Patent
Frankel

(10) Patent No.: US 8,175,244 B1
(45) Date of Patent: May 8, 2012

(54) METHOD AND SYSTEM FOR TELE-CONFERENCING WITH SIMULTANEOUS INTERPRETATION AND AUTOMATIC FLOOR CONTROL

(76) Inventor: David P. Frankel, Los Gatos, CA (US)

( * ) Notice: Subject to any disclaimer, the term of this patent is extended or adjusted under 35 U.S.C. 154(b) by 0 days.

(21) Appl. No.: 13/314,838

(22) Filed: Dec. 8, 2011

Related U.S. Application Data

(60) Provisional application No. 61/510,852, filed on Jul. 22, 2011.

(51) Int. Cl.
  *H04M 3/56* (2006.01)
  *H04N 7/15* (2006.01)
  *H04L 12/18* (2006.01)
  *G06F 15/16* (2006.01)
  *G06F 17/20* (2006.01)
  *H04M 11/00* (2006.01)

(52) U.S. Cl. ........ 379/202.01; 348/14.08; 370/260; 370/261; 379/88.05; 379/88.06; 379/93.21; 455/416; 704/2; 709/204

(58) Field of Classification Search .......... 370/260–262, 370/264, 265; 379/88.05, 88.06, 93.21, 202.01–206.01; 455/416; 704/2, 3, 7, 8, 9; 709/204, 205; 348/14.08–14.1
See application file for complete search history.

(56) References Cited

U.S. PATENT DOCUMENTS

| | | | |
|---|---|---|---|
| 5,233,663 A | 8/1993 | Wood | |
| 5,392,343 A | 2/1995 | Davitt et al. | |
| 5,426,706 A | 6/1995 | Wood | |
| 6,292,769 B1 * | 9/2001 | Flanagan et al. | 704/3 |
| 6,690,932 B1 | 2/2004 | Barnier et al. | |
| 6,816,468 B1 * | 11/2004 | Cruickshank | 370/260 |
| 7,006,604 B2 | 2/2006 | Engelke | |
| 7,006,616 B1 | 2/2006 | Christofferson et al. | |
| 7,245,710 B1 | 7/2007 | Hughes | |
| 7,773,738 B2 | 8/2010 | Sterns | |
| 7,792,276 B2 | 9/2010 | Moore, Jr. et al. | |
| 7,894,596 B2 | 2/2011 | Moore, Jr. et al. | |

(Continued)

FOREIGN PATENT DOCUMENTS

EP 1696338 A1 8/2006

OTHER PUBLICATIONS

Marc A. Zissman, "Automatic Language Identification of Telephone Speech" 1995, Retrieved from the Internet: <http://www.II.mit.edu/publications/journal/pdf/vol08_no2/8.2.1.languageidentification.pdf>.

(Continued)

*Primary Examiner* — Harry Hong

(57) ABSTRACT

A system and method for conducting a conference between a plurality of geographically-dispersed participants, with simultaneous interpretation in a plurality of languages, wherein the method comprises establishing an audio bridge for each of the languages, connecting through a network each participant of a plurality of participants to an appropriate one of the bridges based upon a preferred language of the respective participant, and connecting an interpreter to a first one of the bridges and a second one of the bridges, wherein the interpreter simultaneously listens to a speaking one of the participants through the first one of the bridges and speaks a translation into the second one of the bridges, and wherein the audio connections within the system are configured automatically according to the language being spoken and the abilities of the interpreters. Order is maintained by allowing a participant to make a request to speak, and by granting said requests in turn.

20 Claims, 4 Drawing Sheets

U.S. PATENT DOCUMENTS

| | | |
|---|---|---|
| 7,970,598 B1 | 6/2011 | Flanagan et al. |
| 2006/0165225 A1 | 7/2006 | Sahashi |
| 2007/0050306 A1 | 3/2007 | McQueen |
| 2008/0292081 A1 | 11/2008 | Brannon et al. |
| 2008/0300852 A1 | 12/2008 | Johnson et al. |
| 2009/0006076 A1 | 1/2009 | Jindal |
| 2009/0089042 A1 | 4/2009 | Wald et al. |
| 2009/0125295 A1* | 5/2009 | Drewes ............................ 704/3 |
| 2009/0187400 A1 | 7/2009 | Liu et al. |
| 2009/0274299 A1 | 11/2009 | Caskey et al. |
| 2010/0066803 A1 | 3/2010 | Robotka |
| 2010/0135478 A1 | 6/2010 | Wald et al. |
| 2010/0150331 A1 | 6/2010 | Gitelis et al. |
| 2010/0283829 A1 | 11/2010 | De Beer et al. |
| 2011/0123015 A1 | 5/2011 | Erhart et al. |
| 2011/0246172 A1* | 10/2011 | Liberman et al. ................ 704/2 |

OTHER PUBLICATIONS

Matthias Paulik, Alex Waibel, "Training speech translation from audio recordings of interpreter-mediated communication", Computer Speech & Language, In Press, Corrected Proof, Available online May 10, 2011, Retrieved from the Internet: <http://www.sciencedirect.com/science/article/pii/S0885230811000222>.

Daniel Gile, "Conference Interpreting" Pre-publication version. Published in Brown, Keith (ed). 2006. Encyclopedia of Language and Linguistics, 2nd Ed. Oxford: Elsevier. vol. 3. 9-23. , Retrieved from the Internet: <cirinandgile.com/Elsevier%20encyclop.doc> final published version available on line at <http://www.sciencedirect.com/science/article/pii/B0080448542042851>.

* cited by examiner

METHOD AND SYSTEM FOR TELE-CONFERENCING WITH SIMULTANEOUS INTERPRETATION AND AUTOMATIC FLOOR CONTROL

CROSS REFERENCE TO RELATED PATENT APPLICATION

This application claims priority to U.S. Provisional Application No. 61/510,852 filed Jul. 22, 2011, herein incorporated by reference in its entirety.

BACKGROUND

For decades, certain institutions (such as the United Nations) have conducted business in multiple languages. When (physical) meetings are convened, delegates typically speak in their native languages. Interpreters are present to translate whatever is said into the languages of the other delegates.

To make the meeting as dynamic, interactive, and productive as possible, the interpretation is done "simultaneously." This means that specially-trained individuals listen to a delegate speak in a first language and simultaneously (with a delay of typically only several seconds) translates and speaks in a second language, the translation of what is said by the delegate.

Delegates in such a meeting are equipped with microphones and headphones. The interpreters are typically isolated in soundproof booths and wear headsets. The venue is specially wired and controls are provided to delegates, interpreters, and moderators that allow for selection of audio inputs and outputs and control of audio mixing electronics.

Increasingly, organizations (including companies but also governments, non-profits, various regulatory, rule-making and standards bodies) convene their "meetings" using conference call technology as a way to avoid the time and expense of travel. Delegates or members of the conference can participate from their home locations over a telephone or internet connection.

There is a desire to conduct multi-lingual meetings via conference call, either replacing or extending the "in-person" meeting with a "virtual" meeting that includes participants connected from remote locations.

The traditional conference call lets all participants hear each other, as in a "party line" telephone call. However, there are no specific provisions for conducting such a call in multiple languages.

To date, if there are conference call participants speaking different languages, this is accommodated using "consecutive" interpretation. In this mode of operation, an interpreter is included as an additional participant in the conference. When, for example, a delegate speaks in Spanish, the delegate pauses after one or two sentences, and the interpreter repeats what is said by the delegate in translated form (e.g. English). The delegate then resumes speaking and the process iterates. When a delegate speaks in English, the interpreter waits for the delegate to pause, and then repeats what was said in Spanish, for example. Accordingly, all parties to the conference call are able to hear all of the Spanish and English utterances. This approach is very slow and tedious, and makes the dialogue much less dynamic. The current conference call translation solution becomes completely unwieldy when multiple languages are involved.

It is also important to note that extraneous audio inputs can be quite disruptive. This is true in conventional conference calls, but is even more critical here. Simultaneous interpretation requires tremendous concentration and interpretation can become impossible if the audio input to the interpreter is compromised by speech (or noise) from another delegate.

As meetings of all kinds become more internationally inclusive, the number of languages involved grows, and insisting on a common language for all interpreters may be impractical. It may be necessary to interpret from, for example, English to Mandarin and then Mandarin to Cantonese, and simultaneously English to German to Dutch.

It would be desirable to develop a conference call capability that allows for simultaneous interpretation in two or more languages, without burdening delegates or interpreters with additional language constraints or duties or connection requirements in order to manage the flow of audio.

SUMMARY

The methods and systems of the present invention extend conventional tele-conferencing functionality to address the unique requirements of simultaneous interpretation. The methods and systems introduce novel schemes for: instantiating and managing multiple separate "conference rooms"; connecting the simultaneous interpreters ("SI's"); queuing and recognizing different speakers; and automating the audio flows as necessary. The result is a conferencing experience that is "seamless" for the participants, without imposing additional workload and stress on the SI's.

In one embodiment, a conferencing system supporting simultaneous interpretation in a plurality of languages, comprises: an audio connection for each of a plurality of delegates; an audio connection for an interpreter; a plurality of bridges, wherein the audio connection for each of the delegates is associated with at least one of the bridges and wherein the audio connection for the interpreter is associated with a first bridge and a second bridge of the plurality of bridges; and a processor in communication with the plurality of bridges, the processor configured to: receive a request for the floor from at least one of the delegates; and grant the floor to the at least one of the delegates in response to the request for the floor, wherein the interpreter simultaneously listens to the at least one of the delegates through the first bridge and speaks a translation into the second bridge.

Methods for simultaneous interpretations in a plurality of languages are also described. One method comprises: establishing a bridge for each of the languages; connecting each participant of a plurality of participants to an appropriate one of the bridges based upon a preferred language of the respective participant; connecting an interpreter to a first one of the bridges and a second one of the bridges; and conducting a conference between the plurality of participants, wherein the interpreter simultaneously listens to a speaking one of the participants through the first one of the bridges and speaks a translation into the second one of the bridges.

Another method comprises: establishing a bridge for each of the languages; connecting each participant of a plurality of participants to an appropriate one of the bridges based upon a preferred language of the respective participant; connecting an interpreter to a first one of the bridges and a second one of the bridges; receiving a speaking request from at least one of the participants; and granting the speaking request of the at least one of the participants, wherein the interpreter simultaneously listens to the at least one of the participants through the first one of the bridges and speaks a translation into the second one of the bridges.

The systems and methods of the present invention provide any number of conference bridges (or mixers) associated with a single "conference call." Each bridge can be associated with a particular language and delegates can be assigned to a specific bridge based on their language preference.

The SI's can be specifically identified and connected for "listening" to one bridge, and for "speaking" to another bridge. These connections can be managed automatically.

Delegates or participants can be provided with one or more mechanisms to indicate that they wish to speak. These speaking requests or floor requests are queued and delegates can be recognized ("granted the floor") in turn.

In an aspect, when a delegate is recognized, the audio flows/paths within the system are automatically adjusted, as required. Delegates can be initially muted by the system, but when a delegate has the floor, the audio input is broadcast to a particular bridge associated with the speaking delegate. The "listening" and "speaking" connections for each SI can be adjusted according to the direction of interpretation that is required, based on the language of the recognized delegate. Indications can be presented individually to the parties to let them know that they have the floor (delegate) and the "direction" of interpretation required (SI).

The systems and methods of the present invention provide a multi-lingual "virtual meeting" experience that mimics the physical meeting experience. Delegates and SI's can be located anywhere. Delegates can listen and speak in their preferred language. The conversation flows as it would for a physical meeting, without the slowdown and tedium of consecutive interpretation. Any number of languages can be supported.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
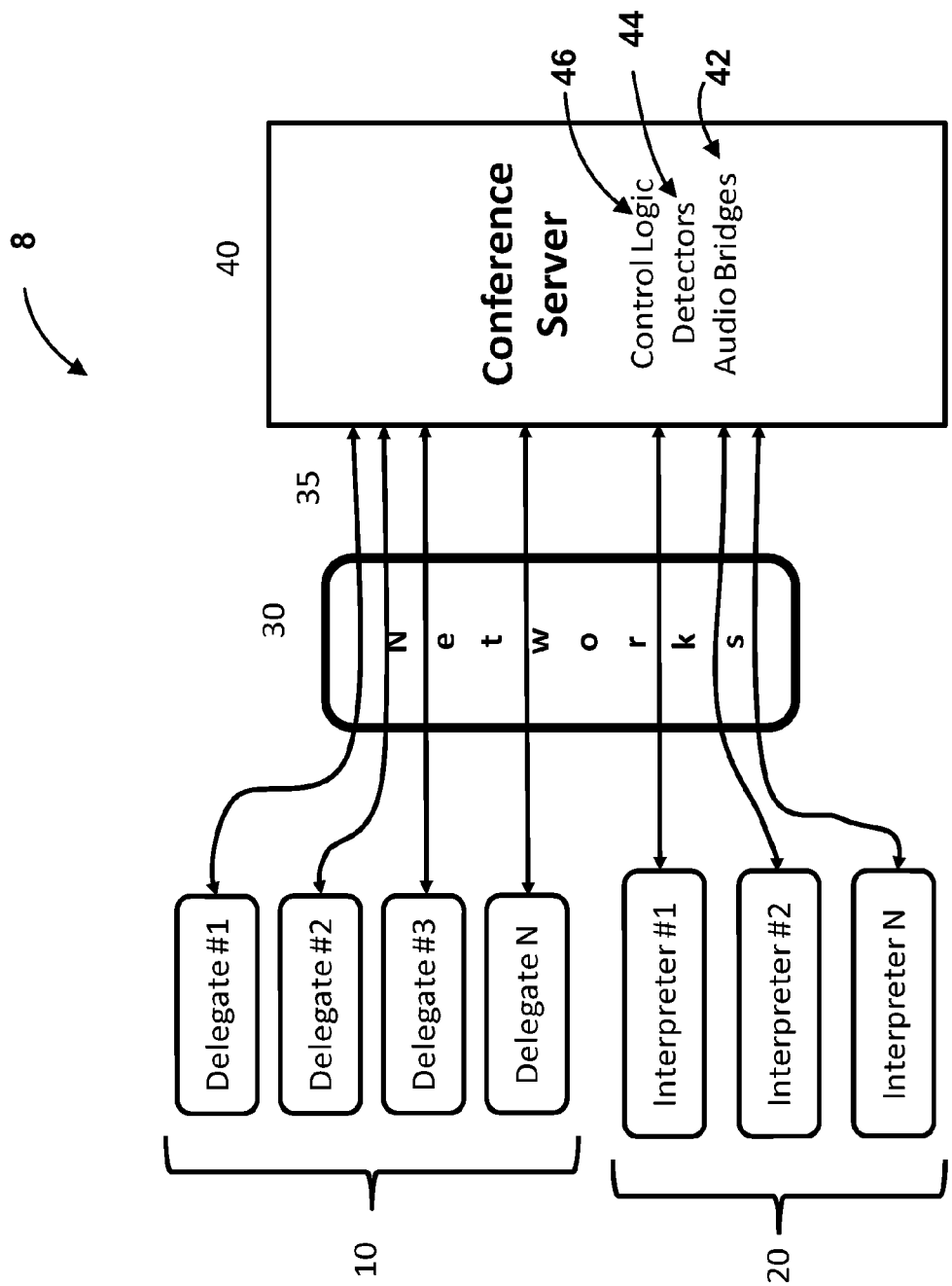
FIG. 1 is a schematic block diagram of a "Language-Aware" Conferencing System.

Before the present methods and systems are disclosed and described, it is to be understood that the methods and systems are not limited to specific methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The system has been described above as comprised of units. One skilled in the art will appreciate that this is a functional description and that the respective functions can be performed by software, hardware, or a combination of software and hardware. A unit can be software, hardware, or a combination of software and hardware.

FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

FIG. 1 illustrates an exemplary "Language-Aware" Conferencing System (LACS) 8. Delegates 10 and interpreters 20 are each equipped with a telecommunications device (not shown). As an example, the telecommunications device can be a conventional telephone, a computer with audio input/output capability, a smart phone, or some purpose-built device. As a further example, the telecommunications device can be equipped with a display. In certain aspects, at least one delegate 10 and/or interpreter 20 is equipped with a telephone for audio exchange as well as a computer with display and control capability.

The telecommunications devices of the delegates 10 and the interpreters 20 is in signal communication with a conference server 40 via connections 35. In certain aspects, the connections 35 are defined through one or more networks 30. As an example, the network(s) 30 can be the conventional public telephone network, the Internet, a mobile telephone network, a private network, or some combination of networks now known or later developed.

In certain aspects, the conference server 40 includes the functional elements of conventional conferencing systems, including audio bridges 42 that mix the audio for selected groups of participants, detectors 44 that sense inputs (such as keypad digits), and control logic 46 that determines how the audio bridges mix the various inputs and outputs. It is understood that the conference server 40 can include any number of components and sub-components for executing the methods disclosed herein. As an example, the conference server 40 can be implemented as software running on a conventional hardware platform (computer server) or a purpose-built hardware.

Figure 2:
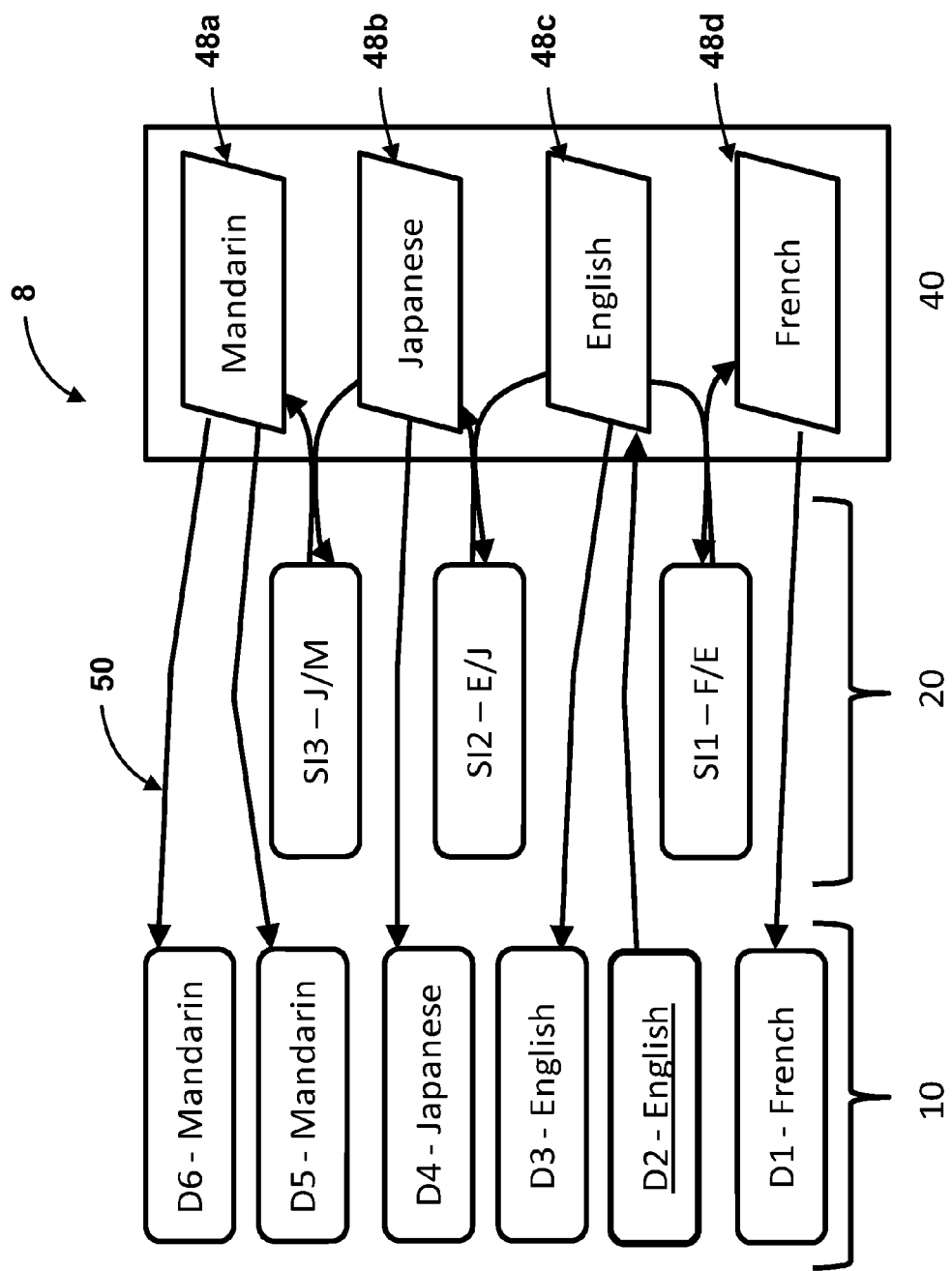
FIG. 2 is a schematic block diagram of the system of FIG. 1 showing a first configuration.

FIG. 2 illustrates six of the delegates 10, identified individually as D1 through D6, and three of the interpreters 20, identified individually as SI1 through SI3, connected to conference server 40. As shown, two of the delegates D2, D3 speak English as a native language, two of the delegates D5, D6 speak Mandarin, one of the delegates D1 speaks French, and one of the delegates D4 speaks Japanese. One of the interpreters speaks French and English SI1, one of the interpreters SI2 speaks English and Japanese, and one of the interpreters SI3 speaks Japanese and Mandarin. Accordingly, the conference server 40 is configured with four bridges 48a, 48b, 48c, 48d, one for each language. It is understood that the conference server 40 can be configured for ay number of languages and bridges.

As shown in FIG. 2, the delegate D2 "has the floor" (or is acknowledged as the speaker) and a plurality of audio paths 50 are configured accordingly. As shown, the arrows of the audio paths 50 indicate a directional flow of the audio data/signal. With the exception of the delegate D2, all of the delegates 10 are in a listen-only mode, connected to their respective bridges 48. Audio from the delegate D2 is fed to the English bridge 48c. The interpreters SI1, SI2 are both listening to the English bridge 48c, wherein the interpreter SI1 is speaking into the French bridge 48d, and the interpreter SI2 is speaking into the Japanese bridge 48b. The interpreter SI3 is listening to the Japanese bridge 48b and speaking into the Mandarin bridge 48a.

Figure 3:
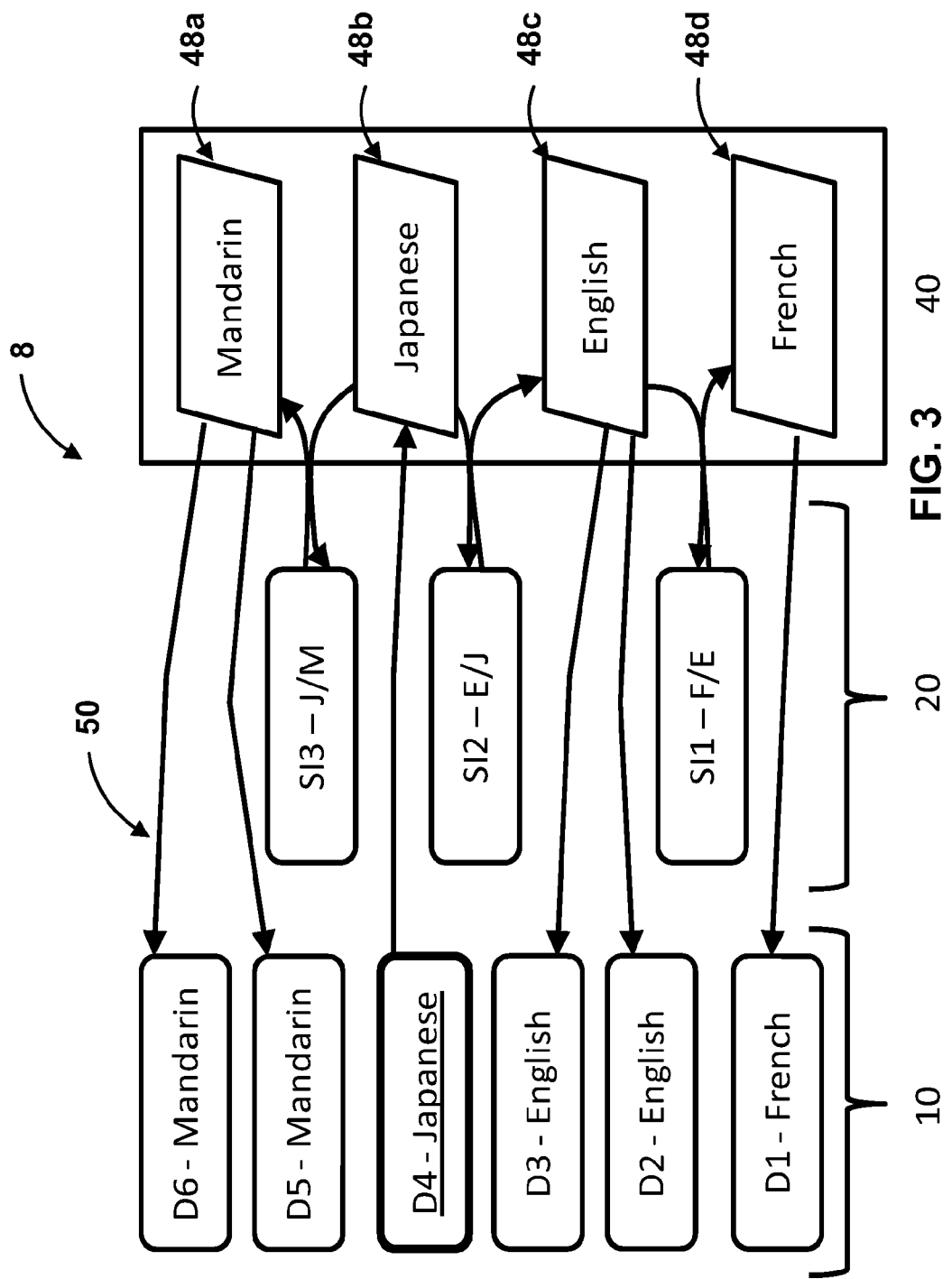
FIG. 3 is a schematic block diagram of the system of FIG. 1 showing a second configuration.

FIG. 3 shows the same set of delegates 10 and interpreters 20 as FIG. 2. As shown, the delegate D4 now has the floor, and the audio paths 50 through the bridges 48 have been reconfigured accordingly. The delegate D2 is shown in a listen-only mode; the delegate D4 is shown speaking into the Japanese bridge 48b; and the interpreter SI2 is shown listening to the Japanese bridge 48b and speaking into the English bridge 48c. It is understood that the audio paths 50 and bridges 48 can be configured for any number of delegates 10 and interpreters 20 speaking any number of languages.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Figure 4:
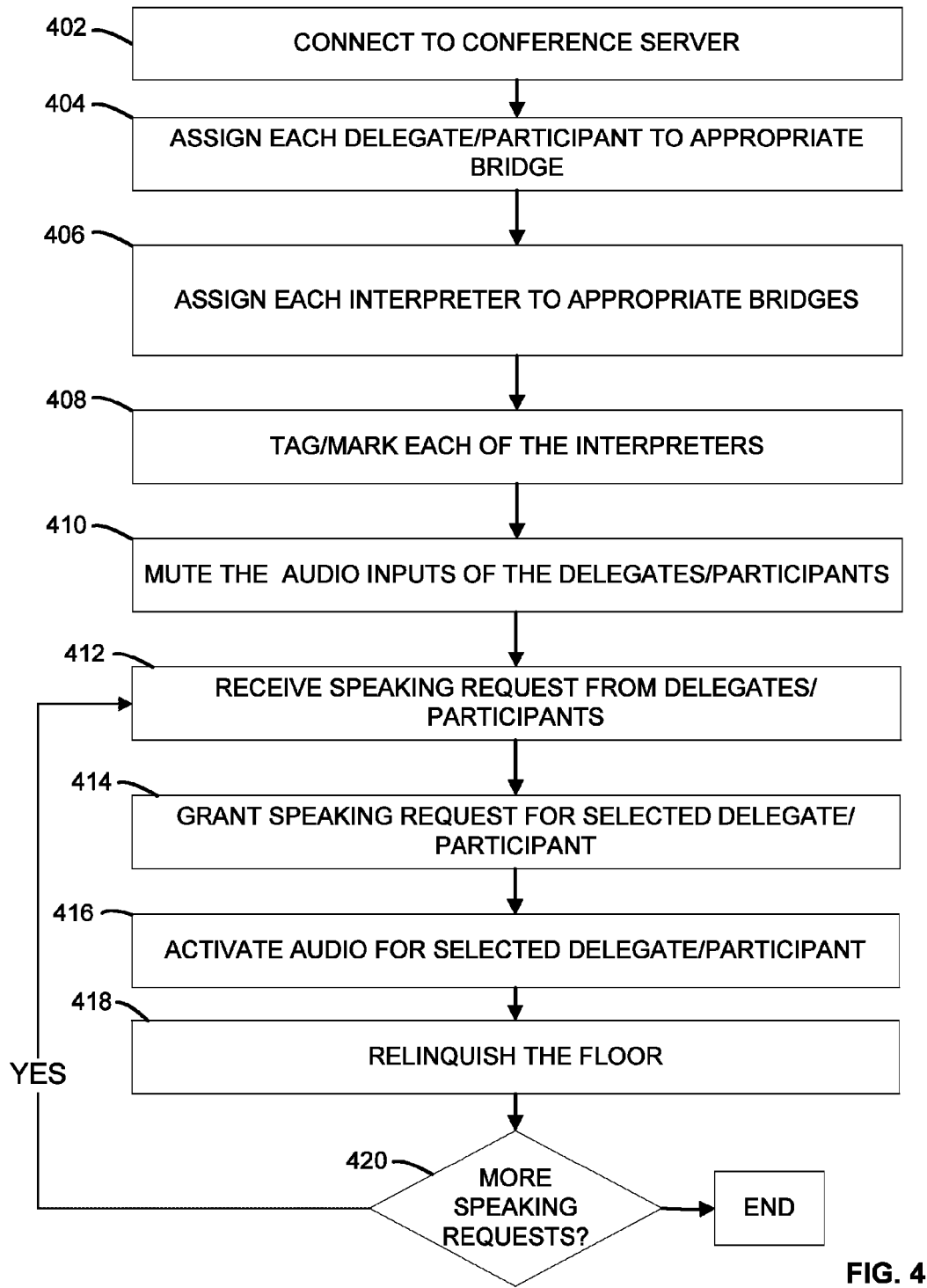
FIG. 4 is a flow diagram of a method for simultaneous interpretation in a plurality of languages.

FIG. 4 illustrates an exemplary process for conducting a multi-lingual tele-conference with simultaneous interpretation. As an example, the system 8 of FIGS. 1-3 can be used to execute the processes described herein. However, other systems and components can be used including hardware and software.

In step 402, each of the delegates 10 and interpreters 20 connect to the conference server 40. In step 404, the conference server 40 assigns each delegate 10 to the appropriate one of the language bridges 48 based on a specific input from the delegate 10. As an further example, one of the delegates 10 can select a language via an interactive voice response (IVR) system when first connecting or dial a pre-defined code on the telephone keypad (e.g. *41 for Spanish, *42 for Mandarin).

As a further example, the assignment of language bridges 48 can be automated based on a selection mechanism; a determination based on the country from which the delegate 10 is calling (e.g. based on the delegate's phone number/origination number or the conference bridge access number dialed), a determination based on a stored value in a "profile" for that particular delegate stored in the LACS 8 and matched based on a PIN; a calling-line identifier, or other link. Other selection mechanisms are also possible.

In step 406, the conference server 40 assigns each interpreter 20 to the appropriate language bridges 48 based on a specific parameters, characteristics, or inputs associated with the interpreter 20. As an example, each of the interpreters 20 is identified by the conference server 40 (e.g. by specific input, or another selection mechanism, analogous to that for the delegates 10) and is "tagged" in the LACS 8 as an "simultaneous interpreter" or some other tag at step 408. As a further example, each interpreter 20 is marked as being capable in at least two specific languages.

In step 410, upon connecting, each of the delegates 10 is muted, meaning that the audio transmitted from each connection towards the conference server 40 is not transmitted into the connected bridge 48.

Accordingly, in step 412, any of the connected delegates 10 can request "the floor". As an example, a request can be transmitted to the conference server 40 identifying the requesting delegate and indicating a request to speak or "have the floor". As a further example, an input request can be received by the conference server 40 from the telephone keypad, such as *1; an input can be sent to the conference server 40 from a connection to the Internet or some other network; a spoken request can be captured by an Automated Speech Recognition engine in a preferred language; or a simple audio input can be received that meets certain predefined amplitude and duration criteria. Other methods are also possible.

In step 414, any of the delegates 10 can be granted the floor. As an example, the delegates 10 are automatically granted the opportunity to speak by the conference server 40, in that requests can be queued in the order they were received, with the conference server 40 processing the requests sequentially. As a further example, the delegates 10 are granted the opportunity to speak by a moderator using a computer-based control panel connected to the conference server 40 over the Internet or some other network or by a moderator using telephone keypad commands or a voice recognition system. As a further example, the floor can automatically be granted to one of the delegates 10 designated as "Chairman" if there are no other outstanding floor requests. Other methods are also possible.

In step 416, a selected one of the delegates 10 is granted the floor and the audio input associated with the selected delegate 10 is activated or un-muted. As an example, the conference server 40 indicates the "opportunity to speak" to the selected delegate 10 by means of a tone or announcement and/or visual display, for example. In certain aspects, the conference server 40 simultaneously un-mutes the audio input from the selected delegate 10 and allows the audio data to be transmitted into the bridge 48 associated with the selected delegate 10.

In an aspect of step 416, the conference server identifies the interpreter(s) 20 marked as capable in the specific language of the selected delegate 10 and alerts the appropriate interpreter(s) 20 via tone or announcement and/or visual display. Accordingly, the appropriate interpreter(s) 20 can listen to the bridge 48 associated with the selected delegate 10 and can speak into the bridge 48 associated with the other languages of the interpreter(s) 20. In an aspect, neither the delegate 10 nor the interpreter 20 has to make any control inputs or changes to local configuration, since the LACS 8 makes the necessary adjustments automatically. As a further example, the conference server 40 repeats the process for the other interpreters 20, allowing each interpreter 20 to receive audio from previously-identified interpreters 20 and to speak into the corresponding bridges 48.

In step 418, the selected delegate 10 relinquishes the floor. The relinquishment of the floor can be accomplished through any of several means, including by example: the delegate 10 inputting a specific sequence from the telephone keypad; the delegate 10 making the indication via a network-connected tool; a speech recognizer identifying some keyword(s) from the delegate 10; silence meeting some amplitude and duration criteria established in the LACS 8; action by a moderator using a control panel or other command input method; or the expiration of a timer maintained by the LACS 8. Other means of relinquishing the floor can be used, as desired. As an example, the conference server 40 indicates the "relinquishing of the floor" to the selected delegate 10 by means of a tone or announcement and/or visual display, for example.

In step 420, upon relinquishment, the process returns to step 512 and the next floor grant is made. As an example, the interpreters 20 whose direction of interpretation is not changing need not be alerted in repeat of steps. As a further example, the conference server 40 can impose a delay between the time a previous delegate 10 is re-muted and the repeat of step 412 to allow for each interpreter 20 to finish translating. It is understood that any delay can be a fixed interval or determined by sensing when each interpreter 20 has gone silent. It is further understood that any of the delegates 10 can continue to make "floor requests" or speaking requests. Accordingly, the delegates 10 take the floor in turn, iterating through the steps of the process until the conference meeting concludes.

It is understood that numerous extensions and enhancements are possible. For example, a "control panel" (discussed hereinabove) can operate, for example, in a web browser connected over the internet to the LACS 8. The control panel can show the identity (name, telephone number, or other) of all of the participants 10 in the meeting, and for each, can indicate bridge assignments. The control panel can also show the presence and identity of the interpreters 20. The control panel can show which participant(s) 10 have/has requested the floor and the order in which the requests were made (or the length of time that any given delegate has been waiting). The control panel can show which participant 10 presently has the floor. Controls can be provided (perhaps only to one or more moderators) to allow granting and revoking the floor. Participants/delegates 10 can be highlighted as they join and exit the LACS 8.

Floor requests need not be granted in the order they were received. A moderator might use the control panel to make such grants using personal discretion or some other pre-determined method. The LACS 8 can allow all or selected delegates 10 to make a "priority" request for the floor, distinguished (perhaps by keypad or spoken input) from a "normal" request; wherein such requests can be handled out of turn. Some or all delegates 10 can be permitted to command the floor, wherein the LACS 8 can grant the floor immediately to a delegate 10 making such request, revoking the floor from the current floor-holder.

The LACS 8 can support more than one interpreter 20 per language. This can be important since simultaneous interpretation is a fatiguing role and can often be sustained only for short periods of time before a rest period is required. Thus, interpreters typically operate in teams of at least two, and might be side-by-side at the same location. The LACS 8 can support interpreters 20 for the same language in different locations over separate connections and the "handoff" from one to another can be by any number of means (analogous to those presented above for other functions). The "active" interpreter 20 for a given language is served by the LACS 8 as indicated above, while the "standby" interpreter(s) 20 for that language are in a listen-only mode.

The simplest examples assume that all of the interpreters 20 share one common language but this is not a requirement of the invention. Each Interpreter 20 by definition understands at least two languages and is associated with (at least) two bridges 48. The LACS 8 can assign interpreters 20 starting with those understanding the same language as the delegate 10 that has the floor, and then iterate assignments so that all delegates 10 are served. For example, a meeting might include English-French (A), French-Dutch (B), Dutch-German (C), and German-Spanish (D) interpreters. When someone speaking Dutch has the floor, Interpreters B and C are assigned to listen to the Dutch bridge, since they can both speak the language of the delegate 10 that has the floor. Interpreter A listens to the French bridge, and Interpreter D listens to the German bridge. Each interpreter 20 speaks into his "other" bridge 48 (that is, the bridge 48 to which he is not listening). When a German-speaking delegate 10 takes the floor, the connections are automatically reconfigured. In this example, words of an English-speaking delegate 10 conversing with a Spanish-speaking delegate 10 would be translated four times before reaching the other party.

Even more complex arrangements are possible. An interpreter 20 might be tri-lingual, in which case he will be assigned listening and speaking bridges 48 according to an algorithm that minimizes the number of sequential translations required while still insuring that every delegate 10 hears the translated audio. The interpreter 20 can hear announcements defining the language to translate from and to. However, even with interpreters 20 capable of three or more languages, a meeting with delegates 10 speaking N languages typically require N−1 interpreters 20 if all delegates 10 are to hear (near) simultaneous interpretations.

Some interpreters may be capable of listening in several languages, but speaking in only some of those languages. This can be considered in the algorithm used by the LACS to make the interpreter assignments.

The LACS 8 can be used in conjunction with a physical meeting, in any of several ways. Each group of like-language speakers at the physical meeting can be treated as an additional delegate 10 on the tele-conference and can be connected via appropriate "patches" between the in-house audio system and a telephonic or VoIP link. So, for example, the English-speakers at the physical meeting would have microphone and speaker connections merged and fed to the English bridge over one connection; likewise for the Spanish speakers, and so on. Alternatively, the delegates 10 at the physical meeting can have individual connections to the LACS 8, or they can share audio connections (amongst those speaking the same language), but have individual buttons or other means to request and relinquish the floor.

The interpreters 20 can also be located at a physical meeting venue, and "shared" with the user of the LACS 8, by means of independent audio connections between each interpreter 20 and the LACS 8. Other audio options and optimizations are also possible.

Interpreters 20 can be scheduled independent of the LACS 8, or the LACS 8 can incorporate a database of interpreters 20 according to language ability and connection information, and the LACS 8 can connect them automatically "on demand" according to the language selections made by delegates 10.

Machine-based interpretation is improving. Instead of using humans as the interpreters 20, the LACS 8 can connect to an automated interpreter for this function, and can dynamically signal the languages and direction required.

Delegates 10 can be permitted to move between bridges 48. For example, a French-speaking delegate D1 might prefer to listen to the meeting in English to hear the intonation and emotion in the English speaker's voice and doesn't want to be subject to "double interpretation" when someone is, say, speaking in Mandarin. However, this delegate D1 may be more comfortable speaking in French. Preferences can be handled automatically by the LACS 8. As an example, when the delegate D1 has the floor audio is routed to the French Language bridge 48*d*. The delegate D1 can also be placed in the French Language bridge 48*d* when another French-speaking delegate 10 (not shown) has the floor. At all other times the delegate D1 can be in the English bridge 48. Such switching could alternatively be done manually by the delegate 10 using an input means described herein.

Similarly, LACS 8 can provide a "Floor Bridge." Listeners in this bridge can hear the speaker that "has the floor" and would not get the benefit of interpretation. The Floor Bridge can be used in conjunction with a physical meeting venue, and can be distributed to interpreters capable of interpreting from multiple languages.

In an aspect, delegates 10 can be allowed to "speak over each other" (or over the interpreters 20). This is likely to degrade the quality of the meeting but might be appropriate for certain situations. Delegates 10 that speak into a bridge 48 that is not the bridge 48 associated with the delegate 10 currently holding the floor would not be heard in some of the other language bridges 48.

While the LACS 8 is optimized for simultaneous interpretation, the LACS 8 can also include a mode of operation for consecutive interpretation. In this mode, when only a delegate 10 is speaking (in any language), all other delegates 10 can listen to the speaking delegate 10. However, when an interpreter 20 is speaking, the LACS 8 automatically causes delegates 10 to hear the interpreter 20 associated with the bridges 48 assigned to each of the delegates 10.

Other conferencing features can be used in conjunction with the LACS 8. For example, the LACS 8 can capture an audio recording from a selected bridge 48 or all bridges 48. The Floor Bridge can be recorded to capture the original audio of all delegates 10. The audio for a particular bridge 48, or all bridges 48, can be transcribed using human transcriptions or automated speech recognition technology.

The LACS 8 can be used together with web conferencing, so that delegates 10 can view, for example, a slide presentation or other graphics. If desired, the presentation could be tailored for each language.

Similarly, the LACS 8 can be used with video conferencing. Delegates 10 can see an image of the person speaking, but would hear the audio in their preferred language.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for interpretation comprising:
    establishing a plurality of teleconference bridges, wherein each bridge of the plurality of teleconference bridges is associated with a respective language of a plurality of languages;
    connecting each participant communications device of a plurality of participant communications devices to a respective bridge of the plurality of teleconference bridges based upon the respective language associated with the respective bridge of the plurality of teleconference bridges, wherein each participant of a plurality of participants is associated with a respective one of the plurality of participant communications devices;
    connecting an interpreter communications device to a first one of the plurality of teleconference bridges and a second one of the plurality of teleconference bridges based upon language capabilities of an interpreter associated with the interpreter communications device; and
    conducting a conference between the participants, wherein the interpreter associated with the interpreter communications device simultaneously listens to a speaking one of the participants through the first one of the plurality of teleconference bridges and speaks an interpretation into the second one of the plurality of teleconference bridges.

2. The method of claim 1, further comprising selectively designating one of the participants as a floor-holder of the conference, wherein each of the participants are blocked from transmitting audio to the plurality of teleconference bridges except for the one of the participants currently designated as the floor-holder, and wherein the connections of the interpreter communications device are automatically configured such that the floor-holder is heard by the interpreter capable of interpreting the preferred language of the floor-holder and the remaining participants hear a resulting interpretation.

3. The method of claim 1, wherein a preferred language of a participant of the plurality of participants is automatically detected and the communication device associated with the participant is automatically connected to a respective bridge of the plurality of teleconference bridges based upon the detected preferred language of the participant.

4. A method for remote interpretation comprising:
    establishing a plurality of teleconference bridges, wherein each bridge of the plurality of teleconference bridges is associated with one of a plurality of languages;
    connecting each participant of a plurality of participants to an appropriate one of the plurality of teleconference bridges based upon a preferred language of the respective participant;
    connecting an interpreter to a first one of the plurality of teleconference bridges and a second one of the plurality of teleconference bridges based upon language capabilities of the interpreter; and;
    receiving a plurality of speaking requests from at least one of the plurality of participants; and
    iteratively granting a speaking request of a select participant of the plurality of participants, wherein the interpreter simultaneously listens to the select participant through the first one of the plurality of teleconference bridges and speaks an interpretation into the second one of the plurality of teleconference bridges.

5. The method of claim 4, further comprising configuring an interconnection of each of the plurality of teleconference bridges in response to a spoken language of the select participant such that the language received through the first one of the bridges is within the language capabilities of the interpreter.

6. The method of claim 4, further comprising selectively blocking each of the plurality of participants from transmitting audio to the bridges except for the select participant.

7. A conferencing system supporting simultaneous interpretation in a plurality of languages, comprising:
    a) a plurality of first audio connections, wherein each of the plurality of first audio connections is associated with at least one participant of a plurality of participants;
    b) a second audio connection associated with a first interpreter;
    c) a plurality of teleconference bridges, wherein each of the plurality of first audio connections is associated with at least one of the plurality of teleconference bridges based upon a preferred language of a respective participant of the plurality of participants and wherein the second audio connection is associated with a first bridge and a second bridge of the plurality of teleconference bridges based upon language capabilities of the first interpreter; and
    d) a processor in communication with each of the plurality of
        teleconference bridges, the
        processor configured to:
        i) receive a plurality of requests for the floor from a plurality of requesting participants of the plurality of participants; and
        ii) iteratively grant the floor to a select participant of the plurality of requesting participants in response to a respective request for the floor, wherein the first interpreter simultaneously listens to a select participant currently granted the floor through the first bridge and speaks an interpretation into the second bridge.

8. The system of claim 7, wherein each of the participants not granted the floor is blocked from sending audio to an associated one of the teleconference bridges.

9. The system of claim 7, wherein the request for the floor is received from a telephone keypad input.

10. The system of claim 7, wherein the select participant relinquishes the floor by a telephone keypad input.

11. The system of claim 7, wherein the select participant receives automatic notification of the grant.

12. The system of claim 7, wherein the select participant receives automatic notification when the select participant no longer has the floor.

13. The system of claim 7, further comprising a third audio connection associated with a second interpreter, wherein the third audio connection is associated with the first bridge and the second bridge of the plurality of bridges based upon language capabilities of the second interpreter.

14. The system of claim 13, wherein the processor is configured to notify one of the first interpreter and the second interpreter whether the other is actively interpreting or is idle.

15. The system of claim 13, wherein the processor is configured to control an interconnection of each of the bridges in response to a spoken language of the select participant such that the spoken language received through a teleconference bridge associated with one of the interpreters is within the language capabilities of the respective interpreter.

16. The system of claim 7, wherein one of the plurality of participants is a group of individuals located in the same room.

17. The system of claim 7, wherein the processor is configured to automatically queue and sequentially grant at least a portion of the plurality of requests for the floor.

18. The system of claim 7, wherein at least one of the audio connections is via the conventional telephone network.

19. The system of claim 7, wherein at least one of the audio connections is via voice-over-internet-protocol.

20. The system of claim 7, further comprising a control panel in communication with the processor, the control panel providing a visual feedback indicating information regarding each of the plurality of participants, the first interpreter, the requests for the floor, and grants of the floor.

* * * * *